United States Patent [19]

Bailey et al.

[11] Patent Number: 5,483,228
[45] Date of Patent: Jan. 9, 1996

[54] SAFETY INDICATING DEVICE FOR FLASHLIGHTS

[75] Inventors: John C. Bailey, Columbia Station; Timothy D. Foley, Brook Park, both of Ohio

[73] Assignee: Eveready Battery Company, Inc., Del.

[21] Appl. No.: 188,868

[22] Filed: Jan. 31, 1994

[51] Int. Cl.$^6$ .................................................. G08B 17/10
[52] U.S. Cl. .................................................. 340/632; 340/636
[58] Field of Search .................................. 340/632, 636; 323/369, 294, 366, 294; 429/90

[56] References Cited

U.S. PATENT DOCUMENTS

| | | | |
|---|---|---|---|
| 3,630,778 | 12/1971 | Kreidl et al. | 136/6 |
| 3,817,717 | 6/1974 | Kreidl et al. | 23/288 R |
| 3,840,403 | 10/1974 | George et al. | 136/6 |
| 3,929,422 | 12/1975 | Kreidl et al. | 23/288 R |
| 3,930,890 | 1/1976 | Dietz | 136/179 |
| 3,939,006 | 2/1976 | Kozawa | 136/6 GC |
| 5,302,902 | 4/1994 | Groehl | 324/434 |

FOREIGN PATENT DOCUMENTS 3503018  7/1992  Germany.

*Primary Examiner*—John K. Peng
*Assistant Examiner*—Julie B. Lieu
*Attorney, Agent, or Firm*—Robert W. Welsh

[57] ABSTRACT

A safety disconnect device for use in detecting a gas in a confined space, such as a flashlight, comprising the use of a catalytic gas recombination material, such as palladium, in conjunction with a heat-sensitive conductive element connected as a switch, in a circuit containing a power supply so that the heat generated by the reaction of the detected gas with a reactant on the surface of the catalytic material will alter the heat-sensitive conductive element to open the circuit.

6 Claims, 1 Drawing Sheet

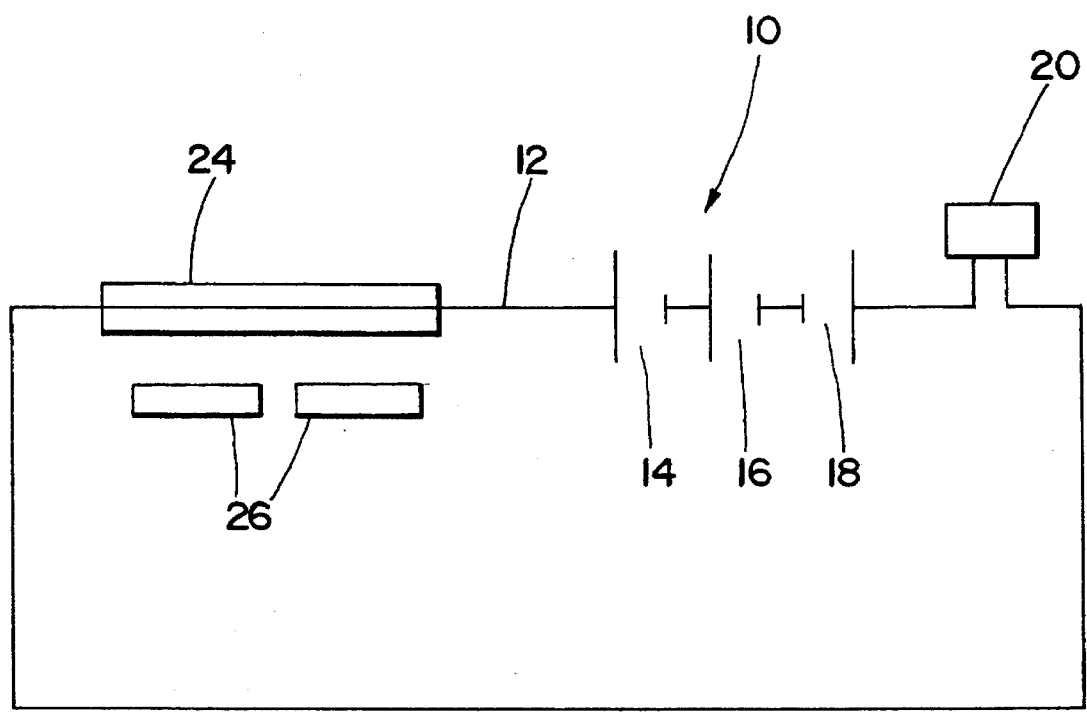

SAFETY INDICATING DEVICE FOR FLASHLIGHTS

The invention relates to a safety disconnect for use in detecting a gas in a confined space and then having means for activating an audio or visual device once the gas is detected.

BACKGROUND OF THE INVENTION

It is well known in the art that the presence of certain gases in a confined space can result in serious problems to individuals or create an environment where the gases could cause an explosion. For example, it is known that problems arise in attempting to confine hydrogen and oxygen under pressure such as in electrochemical cells. In flashlights when a cell is inserted with other cells but in a reverse condition, hydrogen gas could be formed from the charging of the reversed cells by the other cells. In this situation, the hydrogen developed would be confined to the flashlight casing along with oxygen and could result in an explosion. In a similar manner, cells subjected to other abuse conditions could develop hydrogen gas buildup within the cell and thus create a hazardous situation. Other sources of hazardous gas buildup within a confined space could result in injury to human life and possibly create an explosive condition. For example, methane buildup in a mine shaft could not only injure human life but could explode thereby creating physical damage within the mine shaft.

To protect against undesirable hydrogen gas buildup in electrochemical cells, U.S. Pat. No. 3,939,006 discloses the use of a hydrogen absorbing device, preferably a discrete shaped body containing a material that will react chemically with hydrogen gas and a catalyst for the hydrogen consuming reaction. Preferably, the discrete shaped body can be encased in an electrolyte impermeable but hydrogen gas permeable membrane. The material that can react with hydrogen gas is disclosed as any solid compound which will react with or oxidize hydrogen to yield a solid or liquid reaction product. Specifically, suitable materials are those which, at ordinary ambient temperature, will exhibit a negative free energy change ($\Delta F$) associated with the reaction of that material with hydrogen. Preferred reactants include manganese oxides such as manganese dioxide ($MnO_2$), manganic oxide ($Mn_2O_3$), manganese hydroxide ($MnOOH$) and hausmannite ($Mn_3O_4$), cupric oxide, silver oxide, mercuric oxide, manganese phosphate, bismuth trioxide, m-dinitrobenzene and quinone. Of these, manganese dioxide is particularly preferred since it is a relatively inexpensive and readily available material, and its properties and predictability in battery systems are well established.

U.S. Pat. Nos. 3,630,778 and 3,929,422 disclose a catalytic device for use in electrochemical cells in which the catalytic device comprises a foraminous body which includes exposed catalytic surfaces of relatively low gas recombining capacity and an inner nucleus of enclosed catalytic material. The nucleus comprises enclosed catalytic surfaces on which gases passing through the foraminous body react initially within a thermally favorable environment whereby cumulative heating can take place. A resulting build-up of heat at the nucleus is released to raise the temperature of the exposed catalytic surfaces to temperatures at which gases coming into contact with the exposed catalytic surfaces will start to recombine thereon, and continue to react in a sustained manner within a limited temperature range. When, as may occur, the exposed catalytic surfaces are subjected to increasing gas pressure in the battery they become self-limiting in the extent to which their temperature may be raised by exothermic reaction. Thus, the rate of recombination of gases at catalytic surfaces is controlled and limited to positively prevent the exposed catalyst surfaces from reaching temperatures at which an explosion may take place, i.e., temperatures found to be within upper limits of from about 400° C. up to about 600° C., and the range of control may be extended downwardly to values as low as 250° C. for some battery operations. Water resulting from the controlled recombinations at the catalyst surface is returned to the electrolyte with catalyst, surfaces being maintained in a constantly reactive condition.

U.S. Pat. No. 3,817,717 discloses a hydrogen-oxygen recombining device for use in secondary batteries comprising a catalytic mass and an enclosure body having the catalytic mass totally enclosed therewithin. The catalytic mass includes a refractory substrate and a predetermined quantity of catalytic material distributed on the substrate. The enclosure body consists solely of plastic hydrophobic material and has a portion which is gas permeable. The hydrophobic material, including its permeable portion, prevents liquid and mist from the battery electrolyte from entering the body and contaminating the catalytic mass. The permeable portion permits hydrogen and oxygen to enter the body and contact the catalytic mass. The permeable portion also permits water vapor formed by recombining the hydrogen and oxygen to diffuse from the body. The catalytic mass has a catalytic metal content equivalent to a palladium content of not more than 0.1% by weight of the substrate. The catalytic mass, when inducing an exothermic reaction to recombine the hydrogen and oxygen, being characterized by a limited temperature rise within limits below that temperature at which hydrophobicity and permeability of the enclosure body would be changed.

U.S. Pat. No. 3,930,890 discloses a lightweight catalyst body bearing a finely divided metal of the platinum group encased in a porous polytetrafluoroethylene shell which is impermeable to the electrolyte of a cell because of its hydrophobic surface properties. Several small bodies of this kind, each containing about 1 milligram of palladium are inserted in each of a vehicle storage battery and float on the electrolyte surface. They not only recombine hydrogen and oxygen to water and return the water to the electrolyte efficiently, even at high ambient temperatures, but the efficiency of the catalyst is not reduced under conditions causing considerable generation of stibine. The core material on which the catalyst is provided, with or without an additional carrier, may be activated charcoal, hollow glass spheres, a porous ceramic or a synthetic resin foam. The porous hydrophobic shell may be sintered or unsintered or may be made of superimposed sintered and unsintered layers.

German Patent No. 3,503,018 discloses a battery having a plurality of cells with a recombination unit for a catalytic recombination of hydrogen and oxygen and each recombination unit has temperature sensitive sensors connected to a common line to indicate when an excessive recombiner temperature is reached.

SUMMARY OF THE INVENTION

It is an object of the present invention to provide a safety device for monitoring gas buildup in a confined space and having means for generating an audio or visual signal when the gas buildup exceeds a predetermined level.

It is another object of the present invention to provide a safety device employing a heat-sensitive conductive element in combination with a catalytic gas recombination material that will facilitate an exothermic reaction between a gaseous or solid reactant and the gas to be monitored so that when the monitored gas buildup causes the heat from the reaction to reach a predetermined level, it will alter the heat-sensitive conductive element and thereby cause or trigger an audio or visual signal device.

It is another object of the present invention to provide a safety device for monitoring gas buildup within a flashlight so that when the gas buildup exceeds a predetermined level, the battery power supply of the flashlight can be automatically disconnected from the circuit of the flashlight thereby limiting the gas buildup to a tolerable level.

Another object of the present invention is to provide a safety device for monitoring gas buildup within a confined space in which the device is cost effective to produce and easy to use.

The foregoing and additional objects will become fully apparent from the following description.

The invention relates to a safety device for monitoring gas buildup in a confined space comprising a catalytic gas recombination material that will facilitate an exothermic reaction between a gas to be monitored and at least one other gaseous or solid reactant; a heat-sensitive conductive element disposed adjacent to the catalytic gas recombination material; an electrical circuit comprising power means connected to an indicator means; and wherein said heat-sensitive conductive element is connected as a switch means between the power means and the indicator means so that when a buildup of a predetermined level of gas to be monitored is reached, the exothermic reaction of the reactant and gas to be monitored on the surface of the catalytic gas combination material will produce heat that will be detected by the heat-sensitive conductive element and be sufficient to change the conductivity of the heat-sensitive conductive element in the circuit and thereby change the condition of the indicator means.

BRIEF DESCRIPTION OF THE DRAWING

The FIGURE is a sketch of a representative series circuit as described hereinafter.

DESCRIPTION OF THE PREFERRED EMBODIMENTS

The catalytic gas recombination material for use in this invention will depend on the gas to be monitored and the gas must also be able to produce an exothermic reaction with a reactant such as another gas or a reactant solid material. Suitable solid reactants for detecting hydrogen are manganese oxides such as manganese dioxide ($MnO_2$), manganic oxide ($Mn_2O_3$), manganese hydroxide (MnOOH) and hausmannite ($Mn_3O_4$), cupric oxide, silver oxide, mercuric oxide, manganese phosphate, bismuth trioxide, m-dinitrobenzene and quinone. When detecting hydrogen gas with a gas such as oxygen, the reaction of hydrogen and oxygen on a catalytically active surface results in the production of a large amount of heat. Similarly, the reaction of methane or other hydrocarbons with oxygen on a catalytically active surface also results in the production of large amounts of heat. Other gas combinations which produce an exothermic reaction and are suitable for use in this invention are carbon monoxide and oxygen; hydrogen cyanide or ammonia with oxygen; oxides of nitrogen with hydrogen; and hydrogen with solid reactants such as manganese dioxide or silver oxide.

A preferred catalyst for a hydrogen consuming reaction is the so-called "noble metal" or the platinum family of metals which make up Group VIII of the Periodic Table. Suitable noble metals which may be used in the practice of this invention are palladium, platinum or rhodium and alloys thereof. Of these, palladium is preferred since it has a natural tendency itself to absorb and hold hydrogen gas on its surface and would act to retain the gas in the vicinity of the reactant until the reaction between the gas and the reactant can take place. In addition to the noble metals themselves, compounds of Group VIII metals may also be used. Illustrative of such compounds are nickel boride and Raney nickel. Macrocyclic catalysts such as metal phthalocyanines and porphyrins are also suitable. Two preferred catalysts are palladium-catalyzed carbon which contains a palladium layer on a carbon substrate or core and platinum-catalyzed $MnO_2$. Also, a layer of palladium on an alumina core or another substrate could also be used. To form the catalyst into a discrete body, if desired, a suitable binder could be used. The binder should be one which will retain the catalyst in a desired geometric shape that will provide a large surface area. The catalyst could be porous so that maximum surface area can be obtained. The binder can be organic or inorganic material and need only possess the desired physical properties. Powdered synthetic organic polymers, e.g., polyethylene; natural condensation polymers, e.g., starch; and cement are suitable for use as binders in the present invention. A preferred binder is an inorganic cement such as Portland cement.

If desired, the discrete body could be covered entirely with a thin plastic film to protect it from penetration by undesirable materials in the confined space. The protective and preferable film that can be used should be permeable to the gas being reacted and to other gaseous or liquid products of the reaction but impermeable to undesirable materials. The film can be applied by any of the conventional methods of application including dissolving the film material in an organic solvent and spraying the solution on the discrete body and evaporating the solvent; dissolving the film material in an inorganic solvent and dipping the discrete body into the solution and then evaporating the solvent from the surface of the discrete body; wrapping the discrete body in the film and heat shrinking the film to provide a tightly sealed, wetproof covering permeable to the gas being reacted, such as hydrogen; or heat sealing the discrete body in an extruded tube of the selected film material. Any hydrogen gas permeable and undesirable material impermeable film can be used to protect the devices of the present invention. Particularly useful films include polyethylene, copolymers of polyvinyl chloride and polyvinylidene chloride, polystyrene, ethyl cellulose and polyethylene terephthalate. Of these, the polyethylene films in thicknesses of 0.5 to 2.5 mils are preferred, heat shrunk around the discrete body, since they provide a very tight, strong skin which is highly permeable to hydrogen gas.

Another necessary component of the invention is a heat sensitive electrical element. Examples of a heat sensitive electrical element are a bimetallic switch, a positive temperature coefficient resistor, a thermistor and the like. When using a bimetallic switch, the heat generated by the gas reaction on the surface of the catalytic gas recombination material can cause the bimetallic strip to move by expansion/contraction of the strip so as to break or connect an electric circuit. For example, if the bimetallic switch 24 is connected in series with an indicator device 20 in a circuit 12, then upon heating the strip 24 it will move and break the electric circuit 12 thereby disconnecting the indicator device 20 from the power source 14, 16, 18. By connecting the bimetallic strip in parallel across an indicating device, movement of the bimetallic strip will open the circuit containing the strip and then the current in the circuit will flow through the indicator device and activate it. It is also possible to arrange the bimetallic strip so that when heated it will move and close the electric circuit containing an indicating device and power supply. A positive temperature coefficient resistor could also be used since it undergoes a large abrupt change in resistance when heated. A suitable positive temperature coefficient resistor would be Poly Switch Series RDE 050A to RDE 390A. Poly Switch is a registered trademark of Raychem Corporation. The main requirement of the heat sensitive electrical element is that, upon being heated to a predetermined temperature, it will alter its resistance value in a circuit to thereby change an indicator device coupled to a power supply in the circuit. The resistance value change could be complete so that the heat sensitive electrical element will open or close the circuit depending on its initial arrangement in the circuit. The heat sensitive electrical element should be positioned near the catalytic gas recombination material so that it can respond quickly to the heat of the reaction of the monitored gas with the reactant. If a quantitative readout and/or greater sensitivity is required, a comparison circuit can be provided.

The indicating device in the circuit could be a visual alarm, such that a light, which will go on or off when a gas is detected in a confined space; or it could be an audio alarm that would provide an audible sound upon the detection of the gas or it could be both an audio alarm and a visual alarm. The confined space could be any size carton, container or device such as flashlights or radios; or it could be a large confined area such as an underground shaft or room(s) in a building. The invention could be used to monitor or detect a gas such as hydrogen, methane, carbon monoxide, ammonia, nitrogen oxides, hydrogen cyanide or natural gas in a confined space.

A preferred use of the safety device of this invention is in a flashlight, preferably a multicell flashlight, since hydrogen gas can accumulate by an inadvertent cell reversal. Cell venting and gassing of an explosive mixture of hydrogen and oxygen can occur if a cell, e.g., 18 in the FIGURE is reversed in a multicell flashlight 10 and the light is turned on. The hydrogen gas produced by this charge will react with oxygen on the surface of a catalytic discrete body 26 to produce water and heat. The heat can be used to alter the resistance of the heat sensitive electrical element and if the heat sensitive electrical element is in series with the power supply (cells) and the light of the flashlight, it will disconnect the circuit and prevent further charging. Generally, the temperature within the flashlight in which a cell is reversed can reach as high as 80° C. from the reaction of hydrogen with oxygen. The heat sensitive electrical element can be selected so that it will disconnect the circuit at any given temperature rise, such as 60° C. or lower, preferably at about 50° C. In a specific embodiment of a flashlight 10, a heat sensitive element 24 such as a positive temperature coefficient resistor could be connected in series between the power supply (cells) 14, 16, 18 and the light bulb. A catalytic gas recombination material, such as palladium on a substrate, would be formed into a discrete body 26 and positioned adjacent to the heat sensitive element 24. Upon the reaction of hydrogen with the oxygen in the presence of palladium, heat is generated, and when it reaches a preselected level will cause the heat sensitive element to disconnect the circuit of the flashlight and prevent further production of hydrogen.

While the primary embodiment of the invention is directed to the monitoring of hydrogen gas buildup in flashlights such as 10 in the FIGURE, it will be obvious to those skilled in the art that the invention has utility wherever hydrogen monitoring is desired. Examples of such application are liquid level switches, underwater mines and sealed capacitors where hydrogen gas buildup is undesirable and has been a cause of system malfunction. The invention can be utilized to monitor any gas that will react with a reactant to produce an exothermic reaction such as the reaction of methane with oxygen. Moreover, while the present invention has been described with reference to many particular details thereof, it is not intended that these details shall be construed as limiting the scope of this invention.

What is claimed:

1. A safety device for monitoring gas buildup in a confined interior space of a flashlight container containing a plurality of electrochemical cells, said gas buildup being due to gases venting from said cells into said confined space of said flashlight container, comprising a catalytic gas recombination material in said confined space of said flashlight container that will facilitate an exothermic reaction between a gas to be monitored and at least one other reactant material; a heat-sensitive conductive element disposed adjacent to the catalytic gas recombination material; an electrical circuit comprising power means; and wherein said heat-sensitive conductive element is connected as a switch means in said circuit so that when a buildup of a predetermined level of gas to be monitored is reached in said confined space of said flashlight container, the exothermic reaction of the reactant with the gas on the surface of the catalytic gas combination material will produce heat that will be detected by the heat-sensitive conductive element and be sufficient to change the heat-sensitive conductive element in the circuit to disconnect the circuit and thereby limit gas buildup in said confined space.

2. The safety device for monitoring gas buildup in a confined space of claim 1 wherein said heat-sensitive conductive element is selected from the group consisting of bimetallic switches, positive temperature coefficient resistors and thermistors.

3. The safety device for monitoring gas buildup in a confined space of claim 1 wherein said catalytic gas recombination material is selected from the group consisting of palladium, palladium alloys, platinum, platinum alloys, rhodium, rhodium alloys, platinum-catalyzed $MnO_2$, nickel boride, Raney nickel and palladium- catalyzed carbon.

4. The safety device for monitoring gas buildup in a confined space of claim 1 wherein the catalytic gas recombination material is palladium or an alloy of palladium.

5. The safety device for monitoring gas buildup in a confined space of claim 1 wherein the catalytic gas recombination material is a coating on a substrate.

6. The safety device for monitoring gas buildup in a confined space of claim 1 wherein the catalytic gas recombination material is formed into a discrete body.

* * * * *